UNITED STATES PATENT OFFICE.

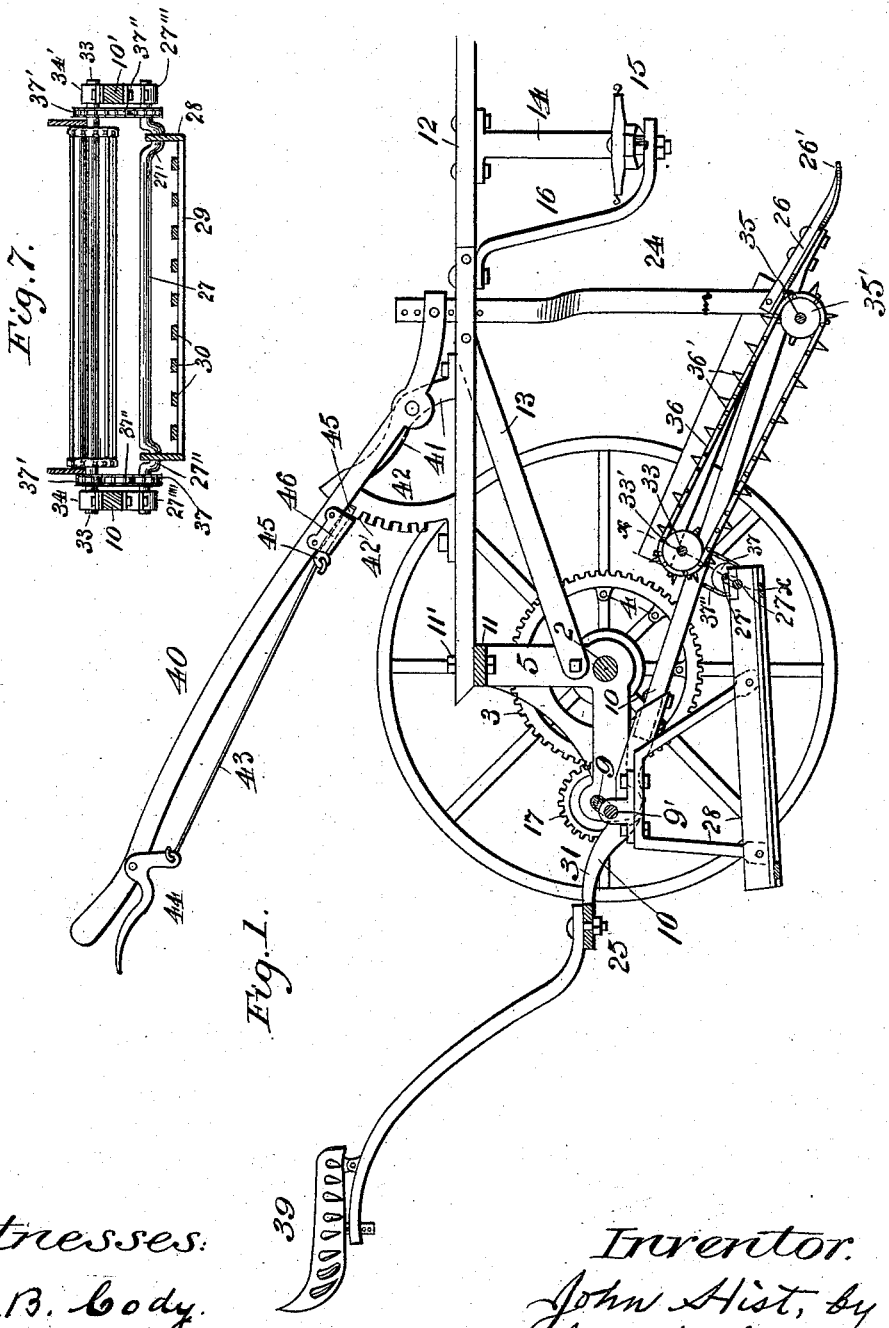

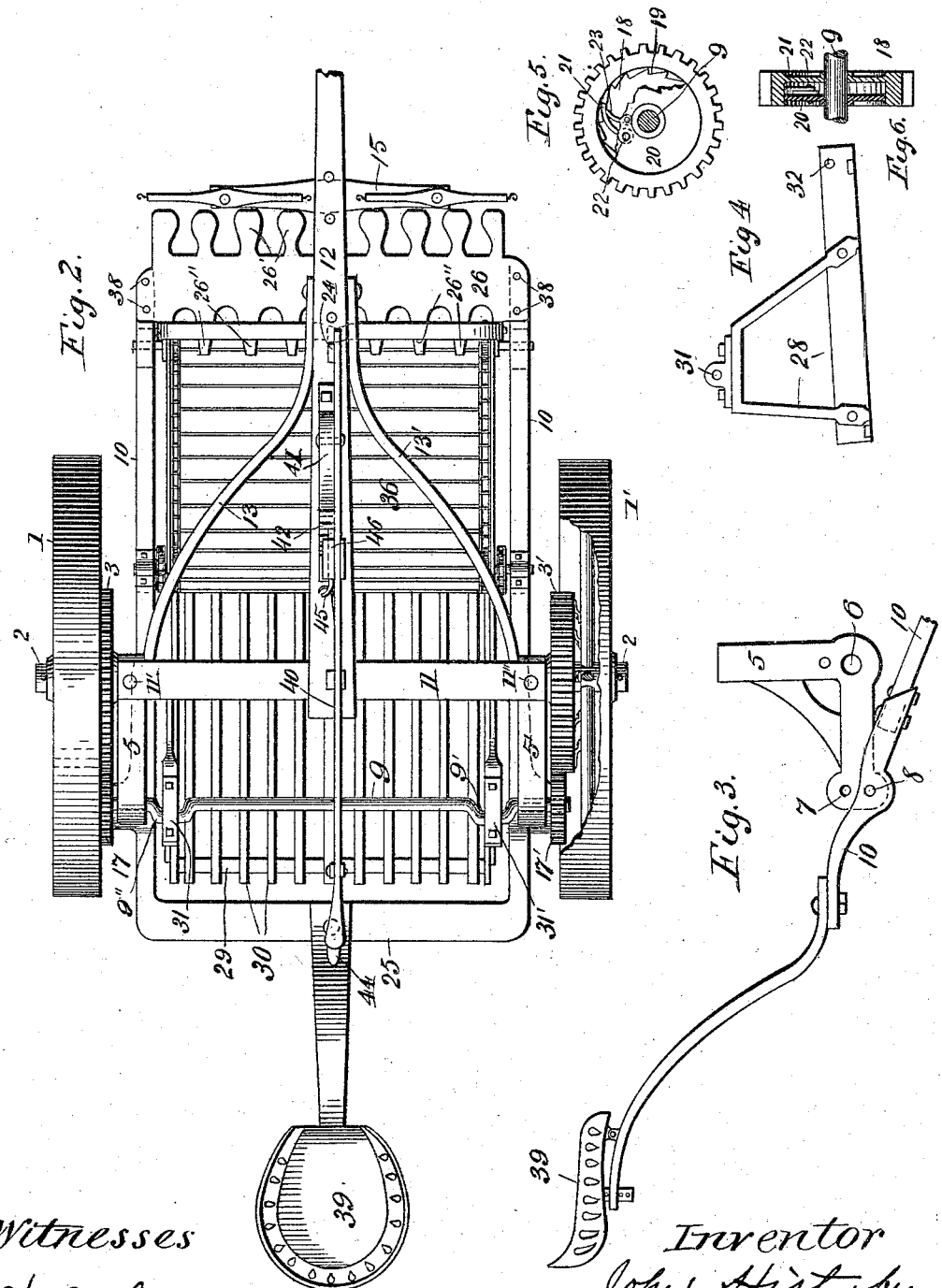

JOHN HIST, OF RANDALL, OHIO.

POTATO-DIGGER.

SPECIFICATION forming part of Letters Patent No. 535,109, dated March 5, 1895.

Application filed December 19, 1892. Serial No. 455,683. (No model.)

*To all whom it may concern:*

Be it known that I, JOHN HIST, a citizen of the United States, residing at Randall, in the county of Cuyahoga and State of Ohio, have invented certain new and useful Improvements in Potato-Diggers, of which the following, with the accompanying drawings, is a specification.

My improvement relates to machines for digging potatoes. Its object is a simple and strong machine which will dig potatoes and separate them from the dirt, and leave the potatoes uncovered on the top of the ground.

My invention consists in the details of construction and combination of parts as described herein and defined in the claims.

In the drawings, Figure 1 is a vertical longitudinal section of my machine. Fig. 2 is a plan of the same, partly in section. Figs. 3, 4, 5 and 6 are details, Fig. 5 being enlarged and partly in section, and Fig. 6 being an axial section of Fig. 5 on the same enlarged scale. Fig. 7 is a sectional view on the line $x\,x$ of Fig. 1.

Traction wheels, 1 and 1', of any suitable construction, turn upon the axle 2. To the inside of the traction wheels 1 and 1' are fixed drive-gears 3 and 3', by means of bolts 4, or by other suitable means.

At each side of the machine, inside of the drive-gears 3 and 3', are L-shaped brackets 5 and 5' having bearings 6, through which the axle 2 passes; and, also, bearings 7, through which the rear shaker shaft 9 passes; and holes 8 for pivoting thereto the main-arms 10 and 10'. A beam 11 extends across the machine and is secured to the tops of the brackets 5 and 5' by means of the bolts 11' and 11''.

The tongue 12 is secured to the cross-beam 11, and braces 13 and 13' attached to the tongue 12 and the brackets 5 and 5' brace the tongue laterally. A drop 14 from the tongue 12 supports the double-tree 15; and a brace 16 reaching from the lower end of the drop 14 to the tongue, as illustrated by Fig. 1, braces the drop.

The rear shaker-shaft 9, which turns in the bearings 7 of the brackets 5 and 5', has two off-sets, 9' and 9'', which form cranks; and upon the ends of said shaft 9 are pinions 17 and 17' which mesh with the drive-gears 3 and 3'. The construction of these pinions is illustrated by Figs. 5 and 6. The pinions 17 and 17' are loose upon the shaft 9. They are recessed in one side, as seen at 18 of Figs. 5 and 6, the recesses having teeth 19 around their peripheries. A disk 20 is fixed firmly upon the shaft 9. To the inside of the disks 20, within the recesses 18, are pivoted clicks or pawls 21, by means of the pivot 22. A spring 23, fastened to the disk 20 below the click 21, forces the click against and between the teeth 19 formed around the periphery of the recess 18.

The clicks 21 are so formed at their outer ends that they will engage the teeth 19 in one direction and will slip over said teeth in the opposite direction. By this means, the pinions 17 and 17' turn free upon the shaft 9 when the machine is backed and do not turn the shaft 9, leaving the shaker passive; while the clicks 21 will engage the teeth 19 when the machine is driven forward, and cause said shaft 9 to revolve with the pinions 17 and 17', and so operate the shaker. Other means than this may be employed to lock the pinions 17 and 17' to the shaft 9 when the machine is driven forward, and allow the said pinions to turn freely upon the shaft 9 when the machine is backed; but the means illustrated and described are as simple and as effective as any that can be employed.

A carrier frame, consisting of the main arms 10 and 10' and the cross-bar 25, is supported near the back end by bolts that pass through the holes 8 (seen in Fig. 3), and form pivots for the frame. The carrier-frame is supported at its front end by means of the bifurcated adjusting support 24. The front ends of the main arms 10 and 10' are connected by the plow 26.

A shaft 27, having cranks 27' and 27'', is supported below the carrier frame in front of the axle by means of the journal boxes 27''' and 27'''' which are secured to the underside of the main arms 10 and 10'. Shaft 27 is the front shaker-shaft.

The shaker consists of two side-frames, 28 and 28', of substantially the form illustrated by Fig. 4, and cross-bars 29, and the longitudinal slats 30. The journals 31 and 31' embrace the cranks 9' and 9'' of the shaft 9, and the journals 32 in the front end of the side-frame 28 embraces the cranks 27' and 27" of the shaft 27.

A shaft 33, carrying a roller 33', is carried in journals 34, 34', above the main-arms 10 and 10', in proximity to the shaft 27. A like shaft, 35, having a like roller 35', is carried below the main-arms 10, 10', at their front end, said roller 35' extending partly under the back edge of the plow 26.

An endless carrier, 36, of any suitable construction, travels over the rollers 33' and 35'. The form illustrated consists of slats secured to a canvas, with ribs 36' projecting therefrom, to carry the dirt and potatoes over the carrier to the shaker.

Upon the shaft 27 is fixed a sprocket wheel 37, and a like sprocket wheel 37' is fixed upon the shaft 33. A flat link-chain travels over the sprocket-wheels 37 and 37'.

The plow 26 is made of metal and is attached by bolts 38, or by other suitable means, to the top of the main-arms 10 and 10', at their front ends. The front edge of the plow 26 is preferably formed with the teeth or shovels 26' thereon, and the back edge preferably is provided with the tongues 26". The teeth 26' enables the plow to enter below and better break up a row of potatoes, and the tongues 26" help to break up the larger pieces of earth and break the same from the potatoes before going upon the carrier 36. The potatoes and earth will then be more readily separated by the shaker. However, other forms of plows may be used upon the machine.

A seat, 39, for the operator is supported from the cross-bar 25 of the main-frame. The cross-bar 25 affords a convenient rest for the operator's feet while driving.

To enable the operator to raise and lower the plow 26, and to gage its depth in the ground, a lever 40 is pivoted to the bracket 41 above the tongue 12, being pivotally connected with the bifurcated adjustable support 24. Upon the tongue 12, back of the bracket 41, I fix a bracket 42—that is, an arc of a circle and it is provided with teeth 42'. A rod 43 connects the bell-crank 44 that is pivoted to the lever 40 and a spring catch 45 that slides in the sleeve 46. The spring-catch 45 engages the teeth 42' of the bracket 42. The construction and operation of this part of the machine is so common and so well understood that the drawings fully explain it.

The shaker inclines backward, as illustrated.

The operation of the machine will be understood readily from the description given and the drawings. As the machine is driven forward, the plow runs under a row of potatoes throwing them up, a portion of the soil and the potatoes being carried by the carrier to the shaker, where the dirt and the potatoes are separated. The potatoes pass off the rear end of the shaker and fall upon the ground. The shaker is operated through the main gear wheels and the pinions, and has a vertical and a reciprocating movement.

The movement of the shaker operates the carrier through the sprocket-wheels and their connecting link-chain.

What I claim as my invention, and desire to secure by Letters Patent, is—

1. The combination, in a potato digger, of a traction wheel; a drive gear secured to the traction-wheel; an axle; a supporting frame; a shaft having cranks, the shaft being held in journals on the supporting frame in front of the axle; a shaft having cranks, the shaft being held in journals back of the axle; a pinion wheel upon the rear shaft on the supporting frame and meshing with the drive gear; a shaker consisting of frames journaled upon the cranks of the shafts that are journaled upon the supporting frame, the shaker having a slatted bottom; an endless carrier adapted to travel over rollers in front of the shaker, driving connections between the shaker and the endless carrier whereby the endless carrier is driven by the motion of the shaker; a plow secured to the front end of the supporting frame in front of the endless carrier, and means for elevating and lowering the plow, substantially as shown and described.

2. The combination, in a potato digger, of an axle, traction wheels upon the axle and having drive gears fixed thereto; L-shaped brackets to the inside of the drive gears upon the axle; a beam secured to the tops of the L-shaped brackets; a shaft having two offsets forming cranks journaled in the L-shaped brackets; main arms pivoted to the L-shaped brackets; a shaft having offsets forming cranks journaled upon the main arms; a shaker journaled upon the cranks of the shaft carried by the L-shaped bracket and upon the cranks of the shaft carried by the main arms; two rollers carried by the main frame; an endless carrier traveling over said two rollers; driving connection between the shaft having cranks that is journaled upon the main arms and one of the rollers that carries the endless carrier; a plow; and means for elevating and lowering the plow and endless carrier, substantially as illustrated and described.

3. The combination, in a potato digger, of an axle; L-shaped brackets journaled upon the axle; a shaft having offsets to form cranks journaled in the L-shaped brackets; main arms pivoted to the L-shaped brackets; a shaft having offsets to form cranks journaled upon the main arms; a shaker journaled upon the cranks of the shaft that is journaled in the L-shaped brackets and the shaft that is journaled upon the main arms; an endless driver; driving connection between the shaft having cranks that is journaled upon the main arms and the endless carrier whereby the endless carrier is driven by the motion of the shaker; and a plow having teeth formed along its front edge and tongues along its back edge, substantially as illustrated and described.

4. The combination, in a potato digger, of an axle; L-shaped brackets journaled upon the axle; a beam connecting the L-shaped brackets, main arms pivoted to the L-shaped brackets; a cross-bar connecting the back ends of the main arms, and a seat supported by the cross-bar that connects the main arms, substantially as illustrated and described.

In testimony whereof I affix my signature, in the presence of two witnesses, this 15th day of October, 1892.

JOHN HIST.

Witnesses:
J. A. OSBORNE,
D. M. OSBORNE.